UNITED STATES PATENT OFFICE.

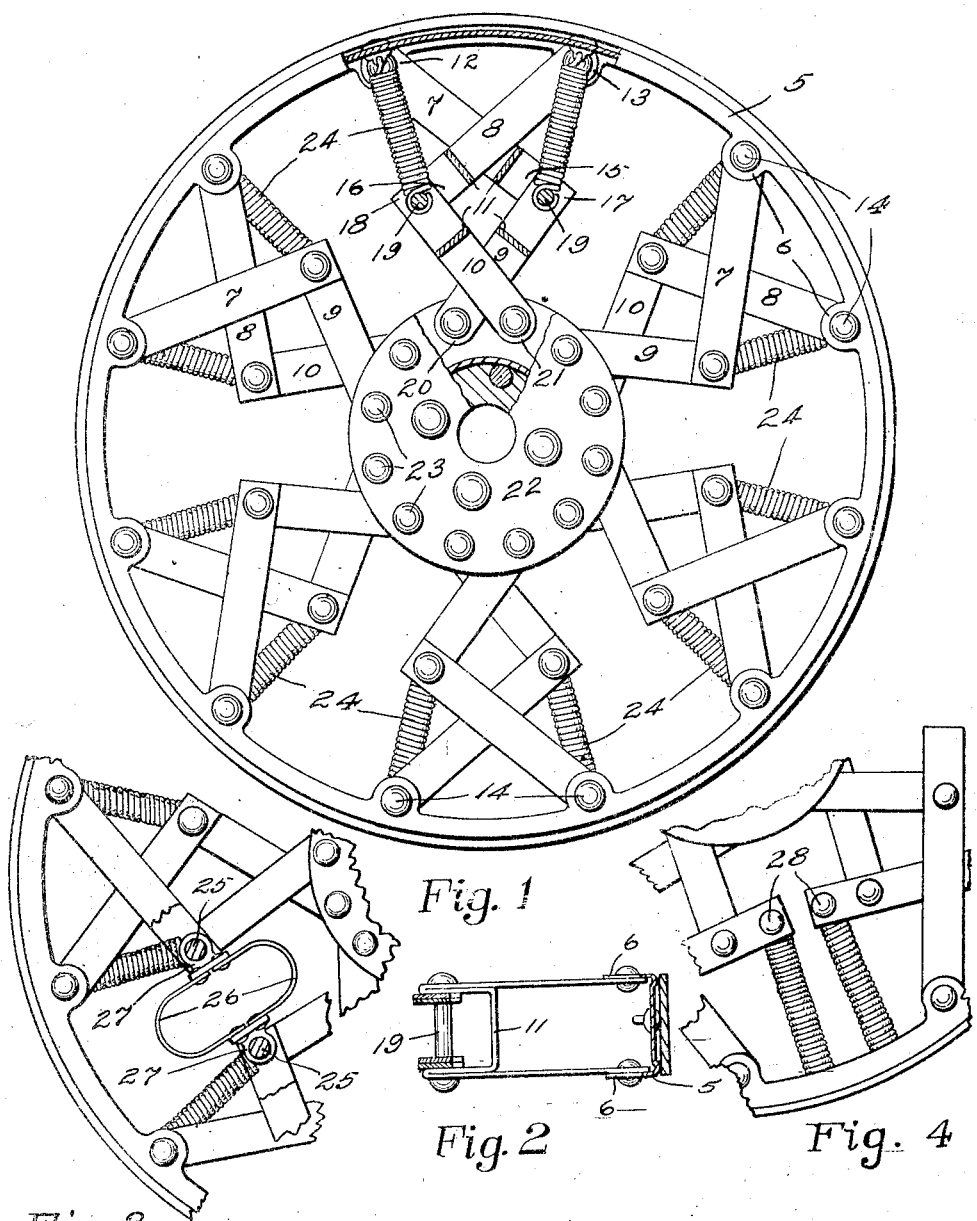

LUCIUS R. NUTTING, OF SEATTLE, WASHINGTON.

VEHICLE-WHEEL.

1,106,965.   Specification of Letters Patent.   Patented Aug. 11, 1914.

Application filed September 20, 1913. Serial No. 790,922.

*To all whom it may concern:*

Be it known that I, LUCIUS R. NUTTING, citizen of the United States, residing at Seattle, in the county of King and State of Washington, have invented a certain new and useful Improvement in Vehicle-Wheels, of which the following is a specification.

My invention relates to improvements in spring wheels that are adapted to be used on trucks, automobiles or other like vehicles and the object of my improvement is to provide a simple and efficient spring wheel that may be constructed strong enough to carry a heavy load and resilient enough to compensate for unevenness in a roadbed.

I accomplish this object by devices illustrated in the accompanying drawing in which—

Figure 1 is a view, partly in side elevation and partly in vertical section, of a wheel embodying my invention. Fig. 2 is a plan view of a detail of my invention associated with a portion of the rim of a wheel shown in cross-section and Figs. 3 and 4 are fragmentary views illustrating modified forms of parts of my invention.

Like reference numerals indicate like parts throughout the drawing.

Referring to the drawing, 5 is the rim of a wheel, 6, 6, are perforated lugs formed to project inwardly from each edge of the rim 5 at certain regular intervals around the circumference of the wheel.

7, 8, 9 and 10 are diagonal strut members that may be formed by bending each of the two ends of a U shaped metal strip outwardly and backwardly through an angle of 180 degrees, as illustrated in Fig. 2, the point at which the bends are made being near the cross portion 11 of such members 7, 8, 9 and 10 in order that the ends which are bent backwardly shall project beyond the cross portions 11 to form a strut, approximately the shape of a letter H, with the cross portion 11 of the H disposed nearer to one end than it is to the other, such cross portion 11 thus forming a cross brace for the strut.

The struts 7 and 8 have their respective ends 12, 12 and 13, 13 articulated with adjacent pairs of the lugs 6, 6, by pivots 14, 14 and are disposed diagonally to cross each other to form the shape of a letter X, the strut 7 having one of its ends 12 articulated with a lug 6 on one edge of the rim 5 and the other of its ends 12 articulated with a similar lug 6 on the opposite edge of the rim 5, as illustrated in Fig. 2, and the strut 8 being articulated in a like manner with adjacent lugs 6, 6, such strut 8 being constructed slightly narrower than the strut 7 in order that it freely may move inside of the side bars of the strut 7.

The inner short ends 15, 15 and 16, 16 of the struts 7 and 8 respectively, are articulated with the outer short ends 17, 17 and 18, 18 of the struts 9 and 10 respectively, by pivot bolts 19, 19 which extend crosswise of the struts as illustrated in Fig. 2, the struts 9 and 10 being crossed to form the shape of a letter X, as shown in Fig. 1, and having their inner ends 20, 20 and 21, 21 pivotally secured to opposite sides of a concentrically disposed hub 22 by pivots 23, the strut 10 being constructed narrower than the strut 9 in order that it freely may move inside of the side bars of the strut 9.

Helical springs 24, 24 disposed radially of the wheel, each have one end secured to one of the bolts 19, 19 and the other end secured to the rim 5 of the wheel and are adjusted in such manner that they are normally taut and tend to resist relative movement of the rim and hub in any direction and two of such tension springs with their four associated strut members, 7, 8, 9 and 10 form a unit or spoke of the wheel, all of the several spokes of the wheel being constructed in the same manner.

In Fig. 3, wherein I have illustrated a modified form of my invention, 25, 25 are bolts or rivets similar to the bolts 19 which connect the articulated ends of the strut members 7, 8, 9 and 10. Elliptical flat springs 26, 26 are disposed between each of the spoke units of the wheel and are connected with the pivot bolts 25, 25 by clips 27, 27; the springs 26, 26 being balanced with respect to each other when the hub of the wheel is in an eccentric position and being active when such hub, in response to its rotation, tends to move from such eccentric position.

In Fig. 4 I have shown a modified form of my invention wherein the strut members 7 and 8 are extended at their inner ends and the helical springs 24, 24 each have one of their ends secured to cross pivots 28, 28 provided in the extended ends of such strut members and their other ends secured to the rim 5 of the wheel by any convenient means. The action of the springs in this device, as illustrated in Fig. 4, being similar to the action of the springs in the device of Fig. 1 hereinbefore described.

The operation of my spring wheel may be readily understood from an inspection of the drawings and may be described as follows: The springs 24, 24 are preferably of such strength that they shall be affected very slightly by the weight of the vehicle when traveling over a smooth roadbed but should the wheel encounter an obstacle as a bump in the roadbed then the wheel will be given a quick upward thrust while the hub which carries a portion of the weight of the vehicle will resist being moved upward and hence there will occur a scissors like movement of the several strut members of the wheel and an extension of the springs 24 that are above the horizontal central axis of the wheel and a consequent contraction of the springs 24 that are below such central axis of the wheel and the lower periphery of the wheel will be permitted by the movement of the strut members and springs to move upwardly without raising the hub should it encounter a bump in the roadbed thus preventing a sudden jar to the vehicle. In a reverse manner if the wheel of the vehicle should drop into a rut or depression in the roadbed then the hub of the wheel to which is secured the axle of the vehicle would be caused to drop downwardly but such hub and axle would be prevented from being abruptly stopped by the springs 24 which would yield to ease the jar that would otherwise result from encountering such rut, the springs above the central horizontal axis of the wheel acting under tension and those below the central horizontal axis acting under compression.

Manifestly various other forms of springs that are well known mechanical equivalents of helical springs may be substituted for the helical springs herein illustrated and described and other minor changes may be made in the details and the form of the various parts embodied in my device without departing from the spirit of my invention or sacrificing any of its advantages.

What I claim is:

1. A spring wheel comprising a rim having inwardly-extending lugs, a hub, and spoke units each consisting of a pair of crossed struts pivotally secured to said hub at their inner ends, and a second pair of crossed struts pivotally secured at their inner ends to the outer ends of the hub struts, and at their outer ends to said lugs, and springs connecting the struts to the wheel rim, each of said struts being formed from a single strip of metal bent upon itself to provide parallel side bars having a double thickness of metal at their inner ends, and a transverse brace connecting said side bars.

2. In a spring wheel, the combination with a hub, a rim, and spring members, of struts each formed from a U-shaped strip of metal, the sides of which are bent outward and then into parallel relation to provide side bars, the connecting portions of the U-shaped strips constituting transverse braces for the struts.

In witness whereof, I, hereunto subscribe my name this 9th day of September A. D., 1913.

LUCIUS R. NUTTING.

Witnesses:
J. C. GAFFNEY,
FRANK WARREN.